(12) United States Patent
Simon

(10) Patent No.: US 8,448,472 B2
(45) Date of Patent: May 28, 2013

(54) I. S. MACHINE WITH PRESSURE CONTROL

(75) Inventor: Jonathan S. Simon, Pleasant Valley, CT (US)

(73) Assignee: Emhart Glass S.A., Cham (CH)

( * ) Notice: Subject to any disclaimer, the term of this patent is extended or adjusted under 35 U.S.C. 154(b) by 1109 days.

(21) Appl. No.: 11/514,456

(22) Filed: Sep. 1, 2006

(65) Prior Publication Data

US 2008/0053154 A1 Mar. 6, 2008

(51) Int. Cl.
*C03B 9/00* (2006.01)
*C03B 9/36* (2006.01)

(52) U.S. Cl.
USPC .................................. 65/301; 65/261; 65/300

(58) Field of Classification Search
USPC ..... 65/261–267, 160–164, 300–301; 264/454
See application file for complete search history.

(56) References Cited

U.S. PATENT DOCUMENTS

| 4,094,656 | A |  | 6/1978 | Colchagoff et al. |
| 4,678,492 | A | * | 7/1987 | Foster ................................ 65/74 |
| 6,269,662 | B1 | * | 8/2001 | Pinkerton et al. ............... 65/161 |
| 6,401,491 | B1 |  | 6/2002 | Wacke |
| 2001/0007198 | A1 | * | 7/2001 | Fenton et al. .................... 65/160 |
| 2003/0101753 | A1 |  | 6/2003 | Fenton |

FOREIGN PATENT DOCUMENTS

| GB | 2297548 | 7/1996 |
| GB | 2297548 | 8/1996 |
| JP | 2002356333 | 12/2002 |
| WO | 8403497 | 9/1984 |

\* cited by examiner

*Primary Examiner* — Jodi C Franklin
(74) *Attorney, Agent, or Firm* — Reinhart Boerner Van Deuren s.c.

(57) ABSTRACT

An I. S. Machine includes a blow station having a blow mold which closes to support a parison with the supported parison undergoing reheat and then being blown into a bottle. When reheat takes place air at low pressure is supplied to the blow tube to pressurize the interior of the parison to prevent the formation of a birdswing in a blown bottle. Air at a second pressure is supplied to the blow tube for blowing the parison into a bottle following reheat.

3 Claims, 3 Drawing Sheets

I. S. MACHINE WITH PRESSURE CONTROL

The present invention relates to I. S. Machines which transform a gob of molten glass into a glass bottle.

BACKGROUND OF THE INVENTION

In an I. S. Machine, a gob of molten glass is delivered to a blank mold in which a "parison" is formed. The formed parison includes the "finish", i.e., the threads, etc., of the bottle to be formed which are at the bottom of the vertically standing parison. The parison also has an elongated vertical hole which extends upwardly from the finish. The finish is gripped by neck ring molds carried by a pair of closed neck rings. When the blank mold is opened, the neck ring is rotated 180 degrees to deliver the parison to the blow station where opposed blow molds will be displaced into a clamped closed position about the parison. The finish, and hence the parison, is supported by the closed blow molds. Reheat then takes place, i.e., the skin of the parison which had been cooled to preserve the shape of the parison, is heated by the inner heat of the parison. When this happens the parison will sag or stretch downwardly by virtue of the parison being suspended from the molds. When the parison stretches to the desired length, either compressed air is introduced into the mold via a blow head sitting on top of the blow molds and/or vacuum is applied through the walls of the blow mold to displace the parison into the form of the mold.

Often cooling air is directed upwardly through the sidewalls of the blow molds to remove heat from the molds. It has been suggested that such air tends to leak into the blowmold. This air, heated by the parison, creates a large pressure that tends to collapse the parison so that instead of a continuous hole, the hole is closed at some central location bringing one side of the parison into engagement with the other side of the parison. Should this happen, a "birdswing" can form when the parison is blown which is a defect requiring the rejection of the ultimately formed bottle.

To avoid birdswings, operators conventionally delay the start of cooling air until the parison has been blown but this slows down the cycle time and this is undesirable.

OBJECT OF THE INVENTION

It is accordingly an object of the present invention to provide a better solution for this problem.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE PREFERRED EMBODIMENT

Each section of an I. S. Machine forms one or more gobs of molten glass into a bottle.

Figure 1:
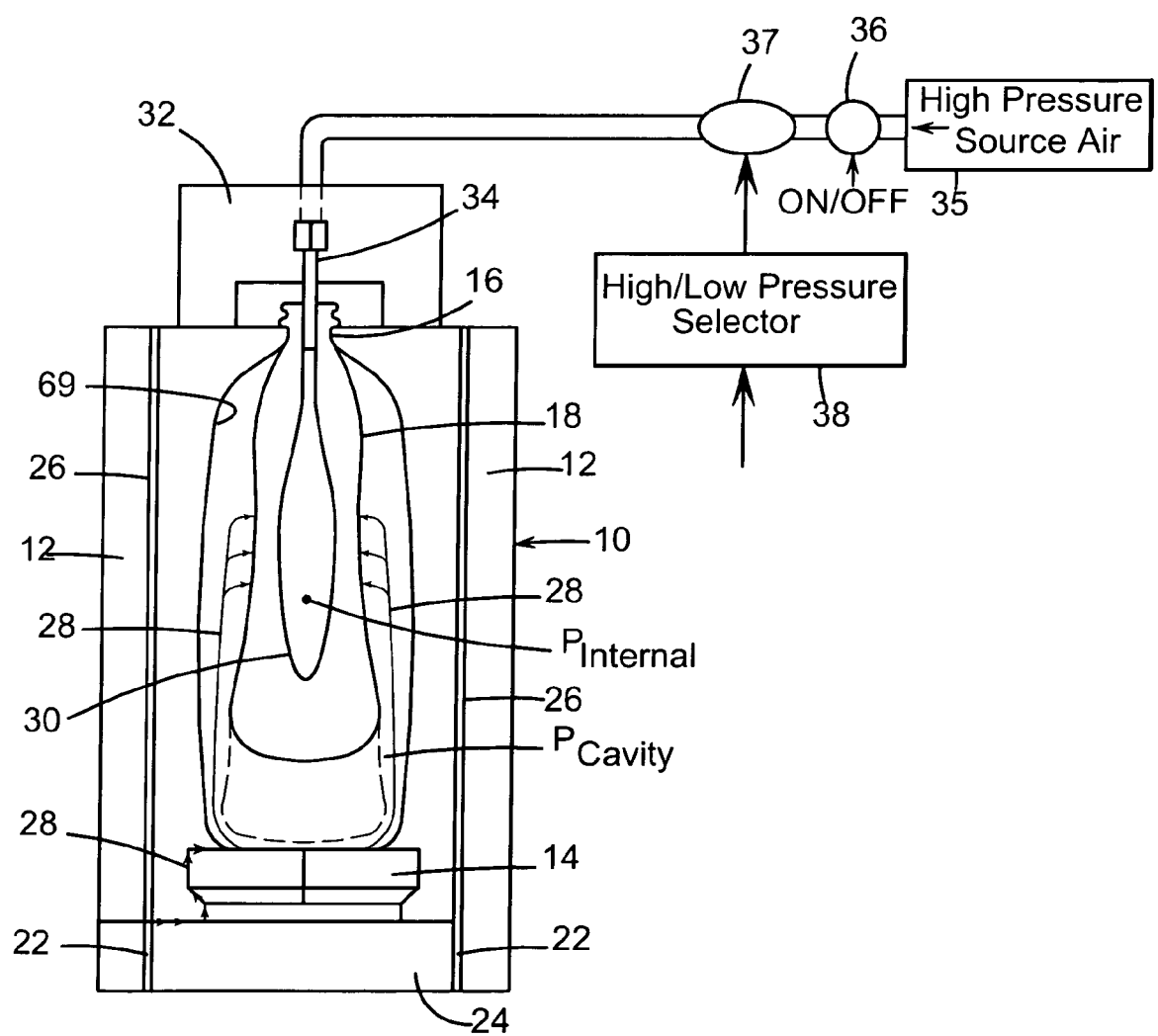
FIG. 1 is a side elevational view of a blow mold mechanism located on top of a blow mold in an I. S. Machine.

For each gob there will be a blank mold for forming a gob into a parison and a blow mold for forming the parison into a bottle. A blow mold 10 is shown in FIG. 1 which is made up of an opposed pair of side molds 12 and a bottom plate 14 which interfits with the side molds when the side molds are fully closed as shown. As shown, the fully closed blow mold sides grip the neck 16 of a parison 18. The finish 20 of the parison is supported by the blow mold.

The parison, which has a long hole 30 extending downwardly from the top, will reheat, i.e., the chilled skin will be heated by the internal heat of the parison, and once reheated the parison will begin to stretch downwardly. When the parison stretches down to the bottom plate as shown in dotted lines, the parison is blown into a bottle either by applying vacuum to the inside surface of the mold and/or by applying air pressure via the blowhead 32 of a blowhead mechanism which is located on top of the blow mold.

Cooling air is supplied to vertical holes 22 in the base 24 for the bottom plate 14 and these holes communicate with cooling holes 26 extending vertically through the blow mold sides 12. When a source of pressurized air is turned on, cooling air will be forced through these cooling holes to remove heat from the blow mold sides. It is believed that this cooling air bleeds between the bottom surface of the blow mold and the top surface of the base and works its way between the bottom plate and the side molds into the interior of the blow mold and that this leakage expands due to the heat of the parison and acts to crush the parison ultimately causing a birdswing in the formed bottle. These pressure forces are illustrated with arrows 28.

The blow head is shown in place on top of the blow mold with the blow tube 34 extending into the parison. The blow head is displaceable between a remote "OFF" position (not shown) and the shown down or "ON" position. The blow head is connected to a source of High Pressure Air 35 which is controlled by an on/off valve 36 and a Switchable Pressure Regulating Valve 37 which has a High/Low Pressure Selector 38. Alternately completely separate sources of high and low pressure air could be used.

Figure 2:
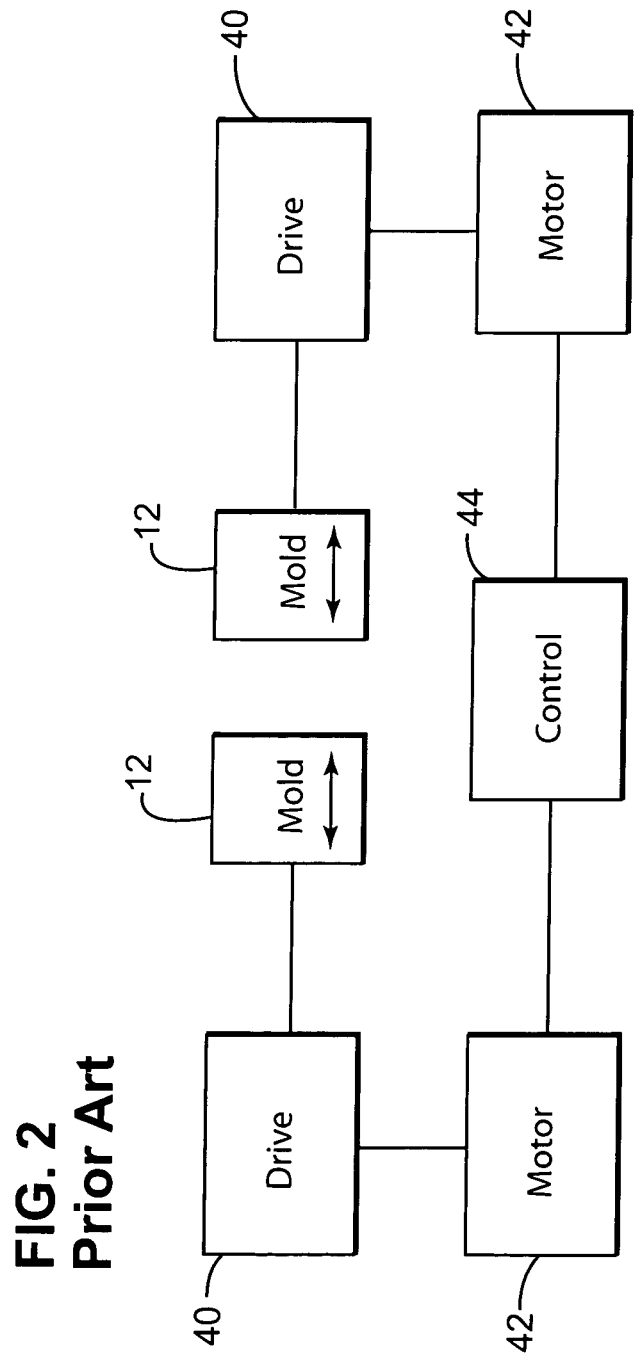
FIG. 2 is a schematic showing a conventional blow mold open and close mechanism.
Figure 3:
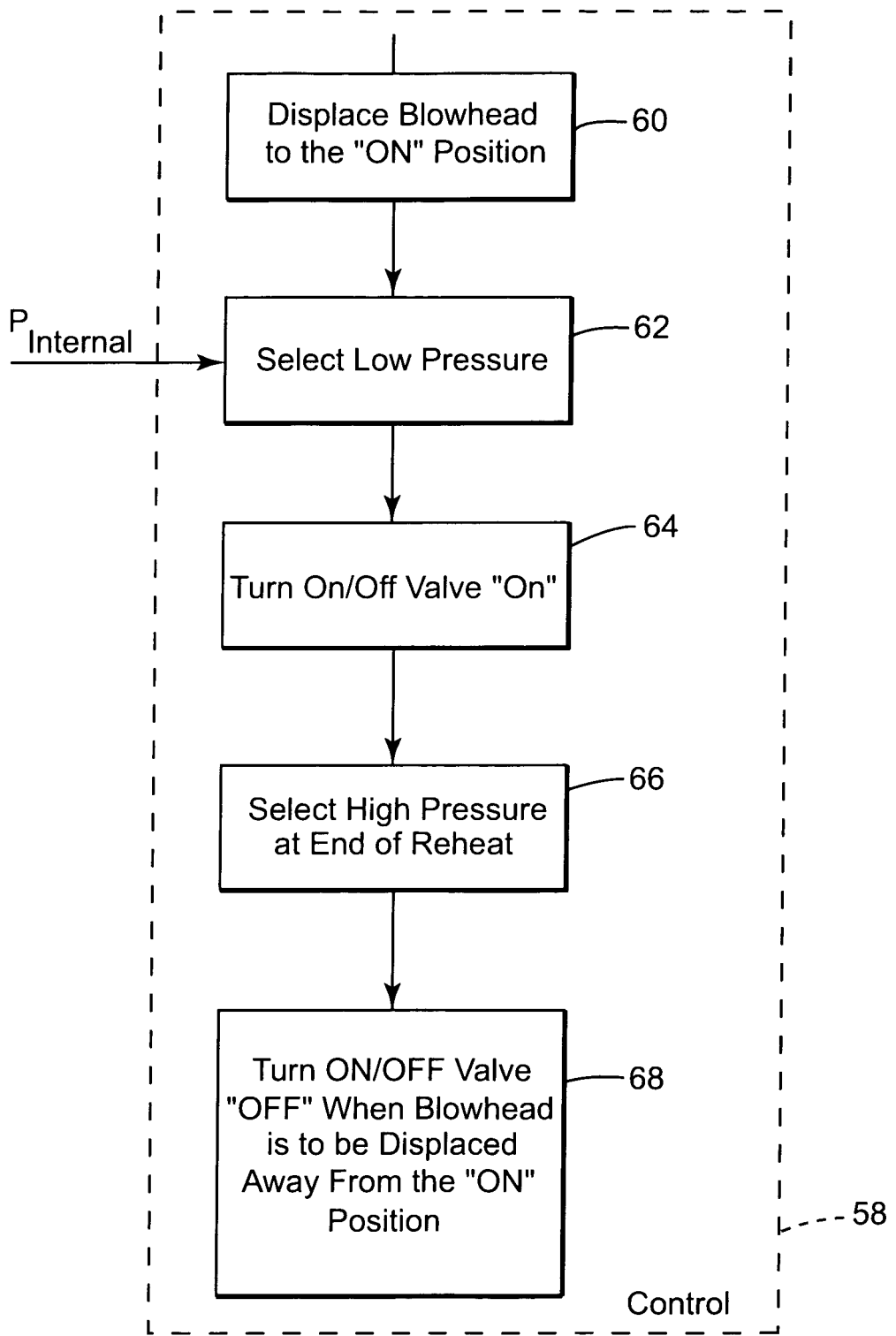
FIG. 3 is a logic diagram illustrating the control for the blow mold open and close mechanism illustrated in FIG. 1.

A conventional blow mold open and close mechanism is shown in FIG. 2 where a pair of opposed side molds 12 are supported for displacement toward and away from each other. Displacement is via a drive 40 powered by a motor 42. Motion is controlled by a suitable control 44.

The control 58 will Displace Blowhead To The "DOWN or ON" Position 60 at the correct time in the cycle (cycle events are initiated by a timing drum which starts every event once each 360 degrees. When the blowhead is located at the "ON" position, the control will Select Low Pressure 62 and Turn ON/OFF Valve "On" 64. Low pressure air will therefore be supplied to the interior of the parison. The pressure of this low pressure air ($P_{internal}$) is set so that a pressure will be defined within the parison during reheat which will prevent the deformation of the reheating parison as a result of any cavity pressure ($P_{cavity}$) due to cooling air leakage into the space between the parison and the blow mold. This pressure will be sufficiently low that it will not blow the parison into a bottle. When reheat is complete, the control will Select High Pressure At End Of Reheat 66 and the parison will be blown by this high pressure into a bottle (the form of the bottle is defined by the interior surface 67 of the blow mold). When the formed bottle has been sufficiently cooled that it can be removed from the blow mold, the control will Turn ON/OFF valve "OFF" When Blowhead Is To Be Displaced Away From The "ON" Position 68.

The invention claimed is:

1. An I. S. machine which includes a blow station having a blow mold which closes to support a parison with the supported parison undergoing reheat and then being blown into a bottle, comprising
   a blowhead mechanism including a blow tube,
   a supply conduit connected to said blow tube,
   means for supplying air at a first pressure to said supply conduit to pressurize the interior of the parison,
   means for supplying air at a second pressure to said supply conduit to pressurize the interior of the parison, and
   a control for controlling the air supply means, wherein the control is configured:
   to control the first-mentioned air supply means to supply air to said supply conduit during reheat to pressurize the interior of the parison to the first pressure ($P_{internal}$), the first pressure being sufficient to resist collapse of the parison which could form a birdswing in the blown bottle, while being insufficient to blow the parison into a blown bottle; and
   to control the second-mentioned air supply means to supply air at the second pressure to said supply conduit to blow the parison into a bottle following reheat.

2. The I. S. machine according to claim 1, further comprising
   a source of high pressure air
   and a high/low pressure selector, the setting of which is controlled by the control, the first-mentioned air supplying means comprising said source of high pressure air and said high/low pressure selector set to low and
   the second-mentioned air supplying means comprising said source of high pressure air and said high/low pressure selector set to high.

3. The I. S. machine according to claim 2, wherein said control is operable to set said high/low pressure selector at low pressure ($P_{internal}$) during reheat and is operable to set said high/low pressure selector at high pressure when the parison is to be blown into a bottle.

* * * * *